United States Patent
Inoue et al.

(10) Patent No.: US 7,382,541 B2
(45) Date of Patent: Jun. 3, 2008

(54) GRADIENT-INDEX ROD LENS, AND ROD LENS ARRAY AND IMAGE PROCESSOR USING THE SAME

(75) Inventors: Teruhide Inoue, Tokyo (JP); Kunihiro Nomiyama, Tokyo (JP); Koichi Sakaguchi, Tokyo (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 386 days.

(21) Appl. No.: 11/243,341

(22) Filed: Oct. 4, 2005

(65) Prior Publication Data

US 2006/0082895 A1 Apr. 20, 2006

(30) Foreign Application Priority Data

Oct. 5, 2004 (JP) ............... 2004-292507

(51) Int. Cl.
*G02B 3/00* (2006.01)
*G02B 6/32* (2006.01)
*C03C 21/00* (2006.01)

(52) U.S. Cl. ................ 359/652; 385/34; 65/400
(58) Field of Classification Search ........ 359/652–655; 385/34; 65/400
See application file for complete search history.

(56) References Cited

U.S. PATENT DOCUMENTS

| | | | |
|---|---|---|---|
| 4,246,016 A | * | 1/1981 | Siegmund ............... 65/400 |
| 4,971,423 A | | 11/1990 | Nakata et al. |
| 6,010,787 A | | 1/2000 | Yamaguchi et al. |
| 6,141,155 A | | 10/2000 | Yamaguchi et al. |
| 2004/0077478 A1 | | 4/2004 | Inoue et al. |

FOREIGN PATENT DOCUMENTS

| | | |
|---|---|---|
| JP | 63-301901 | 12/1988 |
| JP | 5-72337 | 10/1993 |
| JP | 8-13691 | 2/1996 |
| JP | 10-139468 | 5/1998 |
| JP | 10-139472 | 5/1998 |
| JP | 2001-255406 | 9/2001 |
| JP | 2004-151682 | 5/2004 |
| WO | 00/04409 | 1/2000 |

* cited by examiner

*Primary Examiner*—William C Choi
(74) *Attorney, Agent, or Firm*—Hamre, Schumann, Mueller & Larson, P.C.

(57) ABSTRACT

A gradient-index rod lens is provided that is excellent in yield. The gradient-index rod lens has a core/clad structure and is obtained by providing a mother glass rod, which includes a core glass mother composition and a clad glass mother composition, with a refractive index distribution through ion exchange. The clad and the core each contains an alkali metal oxide but are substantially free from lead. The clad and the core each contains an alkali metal oxide and has a basic composition including components other than the alkali metal oxide, but they are different from each other in the basic composition. The clad glass mother composition has a higher thermal expansion coefficient and glass-transition temperature than those of the core glass mother composition. The difference of the thermal expansion coefficient between the clad glass mother composition and the core glass mother composition is larger than $2\times10^{-7}/°C$ but smaller than $20\times10^{-7}/°C$.

14 Claims, 15 Drawing Sheets

GRADIENT-INDEX ROD LENS, AND ROD LENS ARRAY AND IMAGE PROCESSOR USING THE SAME

BACKGROUND OF THE INVENTION

1. Field of the Invention

The present invention relates generally to a gradient-index rod lens having a core/clad structure as well as a rod lens array and an image processor that each includes the rod lens.

2. Related Background Art

A gradient-index rod lens (hereinafter also referred to simply as a "rod lens") is a rod-shaped optical element having a refractive index distribution from its center to its periphery in the section thereof. The rod lens has many characteristics including the following, for instance: it can exhibit lens functions such as, for instance, an imaging function even when both the end faces thereof are flat; and lenses with microdiameters can be produced easily. Using such characteristics, a rod lens array in which the above-mentioned rod lenses are arrayed is employed for a wide range of uses as an imaging lens of an optical system of an image processor (for example, an image-forming apparatus such as an LED array printer, a liquid crystal shutter printer, etc, or an image scanner such as a facsimile, a scanner, etc.). Such a rod lens usually is formed by providing a mother glass rod with a refractive index distribution. A general method of providing the refractive index distribution is one that is carried out through ion exchange.

The mother glass rod is produced by a direct drawing method (a continuous drawing method) that has been used widely due to its excellent productivity. In the direct drawing method, for instance, as shown in FIG. 14, molten glass 101 that has been subjected to a degassing process (a fining process) as required is put into a crucible 103 that is kept warm with a heater 102. The molten glass 101 flows out of the lower end of a nozzle 104 located in a lower end portion of the crucible 103 while being cooled gradually inside the nozzle 104, and thereby is subjected to hot drawing. Thus a mother glass rod (a fiber) 105 with a diameter of about 0.1 mm to 4 mm can be formed continuously. The direct drawing method, however, has a disadvantage in that the molten glass 101 tends to devitrify when being cooled gradually inside the nozzle 104. Particularly, a glass composition that contains $Li_2O$ as a component to be employed for providing a refractive index distribution and that is substantially free from PbO tends to devitrify when being drawn by the direct drawing method.

In order to prevent such devitrification from occurring during the drawing, for instance, JP8(1996)-13691B2 discloses a method in which additives such as $BPO_4$, $Al_2(PO_3)_3$, etc. are added to molten glass.

Furthermore, JP5(1993)-72337B2 discloses a method of forming a mother glass rod 116 having a structure (a core/clad structure) composed of a core glass mother composition 111 and a clad glass mother composition 112 covering the core glass mother composition 111 by the direct drawing method (a concentric crucible drawing method) using a concentric crucible 115 including an inner crucible 113 and an outer crucible 114 (see FIG. 15). As shown in FIG. 15, the inner crucible 113 and the outer crucible 114 are charged with the core glass mother composition 111 and the clad glass mother composition 112, respectively, with the respective mother compositions being in a molten state. The respective mother compositions are allowed to flow out from a nozzle 117 located in the lower end portion of the concentric crucible 115 to form the mother glass rod 116. The mother glass rod 116 thus formed can be drawn out continuously with rollers 118. In this case, when a glass composition that tends not to devitrify is employed as the clad glass mother composition 112, the core glass mother composition 111 can be prevented from coming into contact with the nozzle 117 even in the temperature region where devitrification tends to occur in the case of using the direct drawing method. Accordingly, the core glass mother composition 111 can be prevented from devitrifying and thus the whole mother glass rod 116 can be prevented from devitrifying during the drawing. JP2004-151682A discloses an example of the clad glass mother composition that tends not to devitrify.

The mother glass rod having a core/clad structure (and a rod lens having a core/clad structure formed of this mother glass rod) can provide not only the effect of preventing devitrification from occurring during the drawing but also various effects through the selection of a suitable composition thereof. For instance, when a mother glass rod is formed that includes a clad glass mother composition to which a colorant is added, the rod lens formed thereof can reduce stray light to be caused therein (which is disclosed in, for instance, WO00/04409, JP10(1998)-139468A, JP10(1998)-139472A, and JP2001-255406A).

Furthermore, for instance, JP63(1988)-301901A discloses the following. A gradient-index element is formed in which an optical absorption part containing exchangeable ions and a colorant is present in at least a part of the surface of a transparent dielectric part having a refractive index distribution. The thermal expansion coefficient of the optical absorption part that is obtained after ion exchange is allowed to be equal to or lower than that of the vicinity of the interface between the transparent dielectric part and the optical absorption part. Thus the optical characteristics and strength of the element can be improved.

A mother glass rod having a core/clad structure often warps during ion exchange. Particularly, when a mother glass rod containing $Li_2O$ as a component to be employed for providing a refractive index distribution is subjected to ion exchange, warping may occur more frequently. In a rod lens array composed of warped rod lenses, it is difficult to secure its optical performance (i.e. the resolvable spatial frequency may be lowered or distortion may occur in an image that is transmitted). Hence, there is a demand for rod lenses that can be prevented from warping during ion exchange.

JP63(1988)-301901A discloses the technique of improving the strength of the element that has been subjected to ion exchange but includes no description about the technique of preventing the mother glass rod (a rod lens) from warping during ion exchange.

SUMMARY OF THE INVENTION

The present invention therefore is intended to provide a gradient-index rod lens that is excellent in yield and that can be prevented, for example, from warping during the production thereof (during ion exchange). The present invention also is intended to provide a rod lens array and an image processor that each include the rod lens of the present invention.

The gradient-index rod lens of the present invention has a core/clad structure and is obtained by providing a mother glass rod with a refractive index distribution through ion exchange. The mother glass rod includes a mother composition of a core glass (hereinafter also referred to as a "core glass mother composition") and a mother composition of a clad glass (hereinafter also referred to as a "clad glass mother composition") covering the core glass mother composition. The clad glass and the core glass each contain an alkali metal oxide but are substantially free from lead. The clad glass and the core glass each contain an alkali metal oxide and have a basic composition including components other than the alkali metal oxide. The clad glass and the core glass are different from each other in the basic composition. The clad glass mother composition has a higher thermal expansion coefficient and a higher glass-transition temperature than those of the core glass mother composition. The difference $\Delta\alpha$ between the thermal expansion coefficient $\alpha 1$ of the clad glass mother composition and the thermal expansion coefficient $\alpha 2$ of the core glass mother composition, specifically $\Delta\alpha = \alpha 1 - \alpha 2$, is larger than $2 \times 10^{-7}/°C$ but smaller than $20 \times 10^{-7}/°C$.

The gradient-index rod lens of the present invention also can be said to be a rod lens having a core/clad structure including a core glass and a clad glass covering the core glass, wherein the clad glass and the core glass each contain an alkali metal oxide but are substantially free from lead, the clad glass and the core glass each contain an alkali metal oxide and have a basic composition including components other than the alkali metal oxide, the clad glass and the core glass are different from each other in the basic composition, the clad glass has a thermal expansion coefficient that is not higher than that of the vicinity of the interface with the clad glass of the core glass, and the clad glass has a glass-transition temperature that is not higher than that of the vicinity of the interface with the clad glass of the core glass.

The rod lens array of the present invention includes at least two gradient-index rod lenses of the present invention described above. The rod lenses are arrayed and formed into one body, with their optical axes being substantially in parallel with each other.

The image processor of the present invention includes the rod lens array of the present invention described above. The rod lens array serves as an imaging optical system.

DETAILED DESCRIPTION OF THE INVENTION

Figure 1:
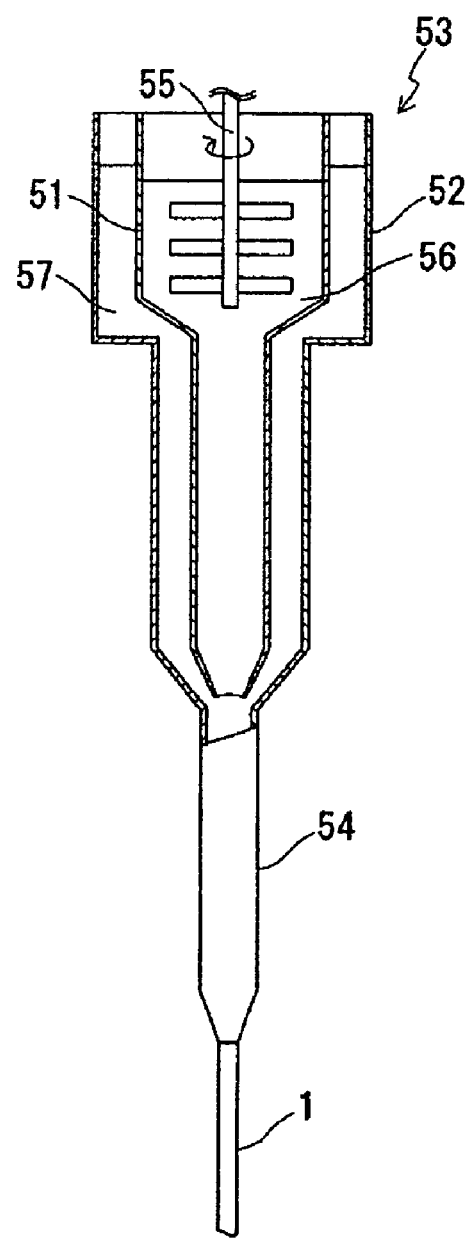
FIG. 1 is a partially cross-sectional view to be used for explaining an example of a concentric crucible drawing method for forming a mother glass rod.

According to the present invention, a mother glass rod has a specified relationship between the core glass mother composition and the clad glass mother composition with respect to the thermal expansion coefficient and the glass-transition temperature. The mother glass rod is provided with a refractive index distribution through ion exchange and thereby a rod lens can be obtained that is excellent in yield and that can be prevented from, for example, warping during the ion exchange.

Mother Glass Rod

Thermal Expansion Coefficient

When a mother glass rod having a core/clad structure is subjected to ion exchange, the mother glass rod is stressed due to the difference in thermal expansion coefficient between the core and the clad as the temperature rises. When the thermal expansion coefficient of the clad glass mother composition is smaller than that of the core glass mother composition, the clad formed of the clad glass mother composition is subjected to tensile stress and thereby the rod lens to be formed tends to warp, for example. This tendency becomes strong when the core glass mother composition contains $Li_2O$ as a component that provides a refractive index distribution (hereinafter also referred to as a "refractive index distribution component") after ion exchange and Li and Na are exchanged for each other through the ion exchange. Conceivably, this is because the difference in thermal expansion coefficient between the core and the clad increases and thereby the tensile stress generated in the clad further increases since the thermal expansion coefficient of the core increases (further increases especially in the vicinity of the interface with the clad) as the content of Na increases through the ion exchange while the thermal expansion coefficient of the clad decreases due to Li that has moved from the core.

On the other hand, when the thermal expansion coefficient of the clad glass mother composition is higher than that of the core glass mother composition, the clad is subjected to compressive stress and warping or the like therefore can be prevented from occurring during the ion exchange. Furthermore, even when the core glass mother composition contains $Li_2O$ as a refractive index distribution component and Li and Na are exchanged for each other through ion exchange, the tensile stress can be prevented from being generated in the clad.

In order further to ensure that the clad is subjected to compressive stress during ion exchange, the difference $\Delta\alpha(\Delta\alpha=\alpha 1-\alpha 2)$ between the thermal expansion coefficient $\alpha 1$ of the clad glass mother composition and the thermal expansion coefficient $\alpha 2$ of the core glass mother composition is:

preferably in the range of $2\times 10^{-7}/° C.<\Delta\alpha<20\times 10^{-7}/° C.$;

more preferably in the range of $2\times 10^{-7}/° C.<\Delta\alpha<15\times 10^{-7}/° C.$; and further preferably in the range of $2\times 10^{-7}/° C.<\Delta\alpha<10\times 10^{-7}/° C.$ In the respective ranges, it is preferable that the lower limit be at least $5\times 10^{-7}/° C.$ An excessively large difference $\Delta\alpha$ may result in the reduction in yield of the rod lens conversely.

Glass-Transition Temperature

The mother glass rod that is used for forming the rod lens of the present invention further has a specified relationship between the core and the clad with respect to the glass-transition temperature (Tg) in addition to the specified relationship with respect to the thermal expansion coefficient ($\alpha$).

When the glass-transition temperature Tg of the clad glass mother composition is lower than that of the core glass mother composition, the compressive stress generated in the clad tends to be eased when the temperature of the mother glass rod is raised to an ion exchange temperature (that is described in detail later but is preferably around the glass-transition temperature Tg of the core glass mother composition, and more preferably not higher than the glass-transition temperature Tg of the core glass mother composition). On the other hand, when the glass-transition temperature Tg of the clad glass mother composition is higher than that of the core glass mother composition, the compressive stress generated in the clad can be maintained more reliably.

Furthermore, when the core glass mother composition contains $Li_2O$ as a refractive index distribution component and Li and Na are exchanged for each other through ion exchange, the glass-transition temperature Tg of the clad tends to decrease due to Li that has moved from the core glass mother composition and the clad tends to deform with the decrease in the glass-transition temperature Tg. The deformation of the clad causes the rod lens to warp during the cooling that is carried out after ion exchange. Accordingly, it is preferable that the glass-transition temperature Tg of the clad glass mother composition be higher than that of the core glass mother composition in the mother glass rod.

That is, in order to obtain a rod lens that is prevented from, for example, warping during ion exchange, it is preferable that the mother glass rod have a specified relationship between the core and the clad with respect to the glass-transition temperature Tg in addition to the specified relationship with respect to the thermal expansion coefficient, as is indicated in the present invention.

In order that the compressive stress generated in the clad during ion exchange may be maintained more reliably, the difference $\Delta Tg$ between the glass-transition temperature Tg1 of the clad glass mother composition and the glass-transition temperature Tg2 of the core glass mother composition ($\Delta Tg=Tg1-Tg2$) is:

preferably in the range of $3° C.<\Delta Tg<60° C.$;

more preferably in the range of $3° C.<\Delta Tg<40° C.$; and further preferably in the range of $5° C.<\Delta Tg<35° C.$ An excessively large difference $\Delta Tg$ may result in the reduction in yield of the rod lens conversely or may cause difficulty in the drawing in forming the mother glass rod.

Alkali Metal Oxide

The clad glass mother composition and the core glass mother composition contain alkali metal oxides as a refractive index distribution component. For instance, the core glass mother composition may contain $Li_2O$ and $Na_2O$ while the clad glass mother composition may contain $Na_2O$ (and $Li_2O$ as required). Such a mother glass rod can be provided with a refractive index distribution through the ion exchange to be carried out by immersing the mother glass rod in molten salt containing Na, for instance. Preferable compositions of the core glass mother composition and the clad glass mother composition are described later. In the present invention, $Li_2O$, $Na_2O$, and $K_2O$ are used as the alkali metal oxides and the total amount of alkali metal oxides denotes the total content by percentage of $Li_2O$, $Na_2O$, and $K_2O$.

Lead

The clad glass mother composition and the core glass mother composition are substantially free from lead (whose typical composition is PbO). Accordingly, a rod lens (composed of the clad glass and the core glass) of the present invention that is formed from the above-mentioned mother glass rod as well as a rod lens array including at least two rod lenses described above are substantially free from lead. Thus they are in conformity with the lead regulations that are included in the environmental regulations of various countries, for instance, the regulations of use of toxic substances in the EU such as "Restrictions of use of certain Hazardous Substances (RoHS)", "Waste Electrical and Electronic Equipment (WEEE)", etc. Furthermore, since the rod lens and the rod lens array of the present invention are substantially free from lead, color dispersion can be reduced while a certain degree of angular aperture is maintained. Thus they are suitable for the processing of full color images.

In this context, the expression "substantially free" described in the present specification denotes that the content by percentage of the component concerned is less than 0.5 mol %.

Basic Composition

Preferably, the clad glass mother composition and the core glass mother composition each contains an alkali metal oxide and has a basic composition including components other than the alkali metal oxide but are different from each other in the basic composition. As described above, a mother composition that contains $Li_2O$ but is substantially free from PbO tends to devitrify during the drawing that is carried out by the direct drawing method. However, when the clad glass mother composition and the core glass mother composition that are different from each other in the basic composition are used, the mother glass rod can be prevented from devitrifying during the production (during the drawing) thereof.

Examples of the difference in the basic composition between the respective mother compositions include: (1) the types of the oxides (other than the alkali metal oxide) contained in the respective mother compositions are not completely identical to each other (i.e. the respective mother compositions are different from each other in at least one type of oxide); and (2) the respective mother compositions contain identical types of oxides (other than the alkali metal oxide) but are different from each other in content by percentage of at least one selected from the oxides. In the case (2) described above, the difference in content by percentage of at least one selected from the oxides between the respective mother compositions is preferably at least 0.5 mol %. When the basic composition is to be studied, it is not necessary to give consideration to any components (any trace components) whose contents by percentage are less than 0.5 mol %, among the oxides contained in the mother compositions.

An example of the case (2) described above is a case where the clad glass mother composition and the core glass mother composition each contain $SiO_2$, $TiO_2$, and alkaline-earth metal oxides as the above-mentioned oxides but are different from each other in the ratio $(X_2/X_1)$ of the $TiO_2$ content by percentage $X_2$ to the total $X_1$ of the contents by percentage of the alkaline-earth metal oxides. In this case, the mother glass rod further can be prevented from devitrifying during the drawing. In the present invention, MgO, BaO, and SrO are used as the alkaline-earth metal oxides and the total amount of alkaline-earth metal oxides denotes the total content by percentage of MgO, BaO, and SrO.

Compositions

The compositions of the clad glass mother composition and the core glass mother composition are not particularly limited as long as they satisfy the above-mentioned specified relationships therebetween with respect to the thermal expansion coefficient and glass-transition temperature. It, however, is preferable that the clad glass mother composition contain $SiO_2$ and $Na_2O$ while the core glass mother composition contains $SiO_2$, $Na_2O$, and $Li_2O$.

In this case, preferably, the clad glass mother composition and the core glass mother composition further contain alkaline-earth metal oxides and the total $X_1$ of the contents by percentage of the alkaline-earth metal oxides contained in each of the mother compositions is less than 25 mol %. This allows the mother glass rod to be prevented further from devitrifying during the drawing.

Preferably, the core glass mother composition includes the following components, indicated by mol %: $SiO_2$ 45 to 65%; $Li_2O$ 3 to 20%; $Na_2O$ 3 to 15%; $K_2O$ 0 to 10%; MgO 0 to 15%; SrO 0 to 20%; BaO 0 to 20%; $B_2O_3$ 0 to 15%; ZnO 0 to 10%; $TiO_2$ 0 to 10%; $Y_2O_3$ 0 to 7%; $ZrO_2$ 0 to 7%; $Nb_2O_5$ 0 to 7%; $In_2O_3$ 0 to 7%; $La_2O_3$ 0 to 7%; and $Ta_2O_5$ 0 to 10%, wherein the total of $ZnO+TiO_2+Y_2O_3+ZrO_2+Nb_2O_5+In_2O_3+La_2O_3+Ta_2O$ mol %, the total of $Li_2O+Na_2O+K_2O$ is in the range of 6 to 35 mol %, and the total of $BaO+SrO+MgO$ is in the range of 0 to 25 mol %. It is further preferable that the core glass mother composition be made substantially of the above-mentioned composition. In this context, the expression "made substantially of" denotes that the presence of any trace components (for instance, impurities derived from industrial glass materials, components derived from a fining agent to be used for degassing (fining) when the mother composition is melted, etc.) whose contents by percentage are less than 0.5 mol % is allowed.

Preferably, the clad glass mother composition includes the following components, indicated by mol %: $SiO_2$ 45 to 65%; $Li_2O$ 0 to 15%; $Na_2O$ 3 to 30%; $K_2O$ 0 to 10%; MgO 0 to 15%; SrO 0 to 20%; BaO 0 to 20%; $B_2O_3$ 0 to 15%; $Bi_2O_3$ 0 to 10%; ZnO 0 to 10%; $TiO_2$ 0 to 10%; $Y_2O_3$ 0 to 7%; $ZrO_2$ 0 to 7%; $Nb_2O_5$ 0 to 7%; $In_2O_3$ 0 to 7%; $La_2O_3$ 0 to 7%; and $Ta_2O$ wherein the total of $Bi_2O_3+ZnO+TiO_2+Y_2O_3+ZrO_2+Nb_2O_5+In_2O_3+La_2O_3+Ta_2O_5$ is in the range of 0 to 20 mol %, the total of $Li_2O+Na_2O+K_2O$ is in the range of 3 to 35 mol %, and the total of $BaO+SrO+MgO$ is in the range of 0 to 25 mol %. It is further preferable that the clad glass mother composition be made substantially of the above-mentioned composition. This further allows the mother glass rod to be prevented from devitrifying during the drawing.

With respect to the core glass mother composition, the reasons for limiting the above-mentioned composition are described below. In the following descriptions, the unit "%" by which the composition is indicated denotes "mol %".

$SiO_2$ $SiO_2$ is an essential component that forms a network structure of glass. The $SiO_2$ content by percentage of less than 45% makes it difficult to form the mother composition. On the other hand, the $SiO_2$ content by percentage exceeding 65% results in an excessively high melting temperature and thus makes it difficult to obtain a practical mother composition.

$LiO_2$ $Li_2O$ has an effect of lowering the melting temperature and is an essential component for providing a refractive index distribution through ion exchange. The core glass mother composition may contain 20% of $Li_2O$ or less. When the $Li_2O$ content by percentage is less than 3%, it is difficult to provide a refractive index distribution. On the other hand, when the $Li_2O$ content by percentage exceeds 20%, the chemical durability deteriorates and devitrification tends to occur during the drawing.

$Na_2O$ $Na_2O$ is an essential component that has an effect of lowering the melting temperature. The $Na_2O$ content by percentage of less than 3% results in an excessively high melting temperature. On the other hand, when the $Na_2O$ content by percentage exceeds 15%, devitrification tends to occur.

$K_2O$ $K_2O$ is an optional component that has an effect of lowering the melting temperature. The $K_2O$ content by percentage exceeding 10% results in deteriorated chemical durability.

$Li_2O+Na_2O+K_2O$

When the total of the contents by percentage of alkali metal oxides (i.e. $Li_2O+Na_2O+K_2O$) is 35% or less, practical durability can be prevented from deteriorating.

MgO

MgO is an optional component that has an effect of lowering the melting temperature. When the MgO content by percentage exceeds 15%, devitrification tends to occur.

SrO

SrO is an optional component that has an effect of lowering the melting temperature. When the SrO content by percentage exceeds 20%, devitrification tends to occur.

BaO

BaO is an optional component that has an effect of lowering the melting temperature. When the BaO content by percentage exceeds 20%, devitrification tends to occur and the specific gravity becomes excessively high.

Alkaline-Earth Metal Oxide

The alkaline-earth metal oxide has an effect of lowering the melting temperature. On the other hand, when the content by percentage thereof is excessively high, devitrification tends to occur. Hence, it is preferable that the total $X_1$ of the contents by percentage of the alkaline-earth metal oxides be 25% or less.

$B_2O_3$ $B_2O_3$ is an optional component that has an effect of promoting formation of the core glass mother composition (glass forming ability) during the drawing. The $B_2O_3$ content by percentage may be 15% or less.

Other Components

The core glass mother composition may include ZnO, $TiO_2$, $Y_2O_3$, $ZrO_2$, $Nb_2O_5$, $In_2O_3$, $La_2O_3$, and $Ta_2O_5$ in the above-mentioned composition ranges. These components have an effect of increasing the refractive index of the core glass. The total of the contents by percentage of such components (i.e. $ZnO+TiO_2+Y_2O_3+ZrO_2+Nb_2O_5+In_2O_3+La_2O_3+Ta_2O_5$) is preferably 20% or less in order to prevent devitrification from occurring during the drawing.

With respect to the clad glass mother composition, the reasons for limiting the above-mentioned composition are described below. In the following descriptions, the unit "%" by which the composition is indicated denotes "mol %".

$SiO_2$

The same description as that given with respect to the core glass mother composition also applies here.

$Li_2O$ $Li_2O$ is an optional component that has an effect of lowering the melting temperature. The clad glass mother composition may contain 15% of $Li_2O$ or less. When the $Li_2O$ content by percentage exceeds 15%, the chemical durability deteriorates and devitrification tends to occur.

$Na_2O$ $Na_2O$ is an essential component that has an effect of lowering the melting temperature. The $Na_2O$ content by percentage of less than 3% results in an excessively high melting temperature. On the other hand, the $Na_2O$ content by percentage exceeding 30% results in deteriorated chemical durability.

$K_2O$

The same description as that given with respect to the core glass mother composition also applies here.

$Li_2O+Na_2O+K_2O$

The same description as that given with respect to the core glass mother composition also applies here.

MgO

The same description as that given with respect to the core glass mother composition also applies here.

SrO

The same description as that given with respect to the core glass mother composition also applies here.

BaO

The same description as that given with respect to the core glass mother composition also applies here.

Alkaline-Earth Metal Oxides

The same description as that given with respect to the core glass mother composition also applies here.

$B_2O_3$ $B_2O_3$ is an optional component that has an effect of promoting the formation of the clad glass mother composition (glass forming ability) during the drawing. The $B_2O_3$ content by percentage may be 15% or less.

Other Components

The clad glass mother composition may include $Bi_2O_3$, ZnO, $TiO_2$, $Y_2O_3$, $ZrO_2$, $Nb_2O_5$, $In_2O_3$, $La_2O_3$, and $Ta_2O_5$ in the above-mentioned composition ranges. These components have an effect of increasing the refractive index of the clad glass. The total of the contents by percentage of such components (i.e. $Bi_2O_3+ZnO+TiO_2+Y_2O_3+ZrO_2+Nb_2O_5+In_2O_3+La_2O_3+Ta_2O_5$) is preferably 20% or less in order to prevent devitrification from occurring during the drawing.

Colorant

The clad glass mother composition may include an oxide of at least one element selected from Fe, Co, Ni, Mn, Cr, and Cu, as a colorant. When the clad glass mother composition includes a colorant, stray light further can be prevented from occurring in a rod lens formed using the clad glass mother composition, due to the effect of optical absorption by the colorant.

The total of the contents by percentage of such oxides contained in the clad glass mother composition is preferably 10 mol % or less. When the total exceeds 10 mol %, devitrification tends to occur during the drawing.

Production Method

The mother glass rod may be formed by the common concentric crucible drawing method using, for example, a concentric crucible 53 including an inner crucible 51 and an outer crucible 52 such as the one shown in FIG. 1. The concentric crucible 53 shown in FIG. 1 is provided with a nozzle 54. The nozzle 54 is formed at the lower ends of the inner crucible 51 and the outer crucible 52 so as to extend continuously from the outer crucible 53. The inner crucible 51 includes a stirrer 55 that stirs a molten mother composition contained in the inner crucible 51.

The inner crucible 51 is charged with a core glass mother composition 56 that is in a molten state while the outer crucible 52 is charged with a clad glass mother composition 57 that also is in a molten state. If necessary, the mother compositions may be subjected to a degassing process (a fining process) first and then may be put into the respective crucibles. Subsequently, the core glass mother composition 56 and the clad glass mother composition 57 are drawn out from the lower end of the nozzle 54 and thereby the mother glass rod 1 having a core/clad structure can be formed. Furthermore, mother compositions that are in a semi-solid or solid state may be put into the respective crucibles and then may be heated and melted in the crucibles.

In the concentric crucible drawing method, it is possible to control the diameter of the core and/or the thickness of the clad of the mother glass rod 1 to be obtained, by controlling the difference in surface level between the molten clad glass mother composition 57 and the molten core glass mother composition 56, the height of the surfaces of the respective mother compositions with respect to the nozzle 54, the temperature of the nozzle 54, etc. The diameter of the core 2 is, for instance, in the range of about 0.3 mm to 1.1 mm while the thickness of the clad 3 is, for example, in the range of about 5 μm to 100 μm.

Figure 2A:
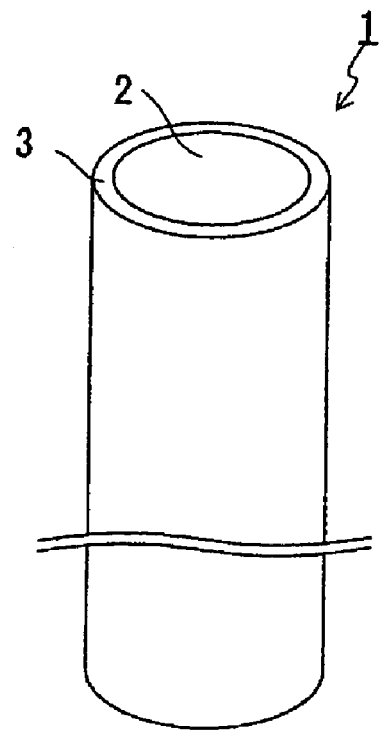
FIG. 2A is a schematic view showing an example of a mother glass rod.
Figure 2B:
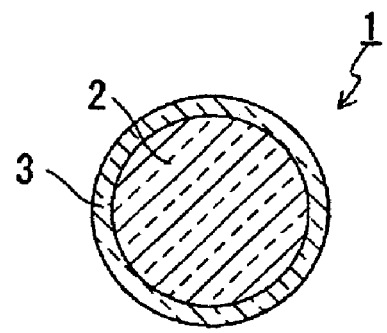
FIG. 2B is a schematic view showing a section of the mother glass rod shown in FIG. 2A cut in the direction perpendicular to the optical axis of the mother glass rod.

An example of the mother glass rod 1 is shown in FIGS. 2A and 2B. FIG. 2B is a diagram that schematically shows a section of the mother glass rod 1 shown in FIG. 2A cut in the direction perpendicular to the optical axis direction (i.e. the central axis direction) of the mother glass rod 1. As shown in FIGS. 2A and 2B, the mother glass rod 1 has a structure (a core/clad structure) in which the clad 3 formed of the clad glass mother composition covers the periphery of the core 2 formed of the core glass mother composition. In FIGS. 2A and 2B, a clear boundary line is shown between the core 2 and the clad 3. In an actual mother glass rod 1, however, the boundary line is not always observed visually.

Figure 3:
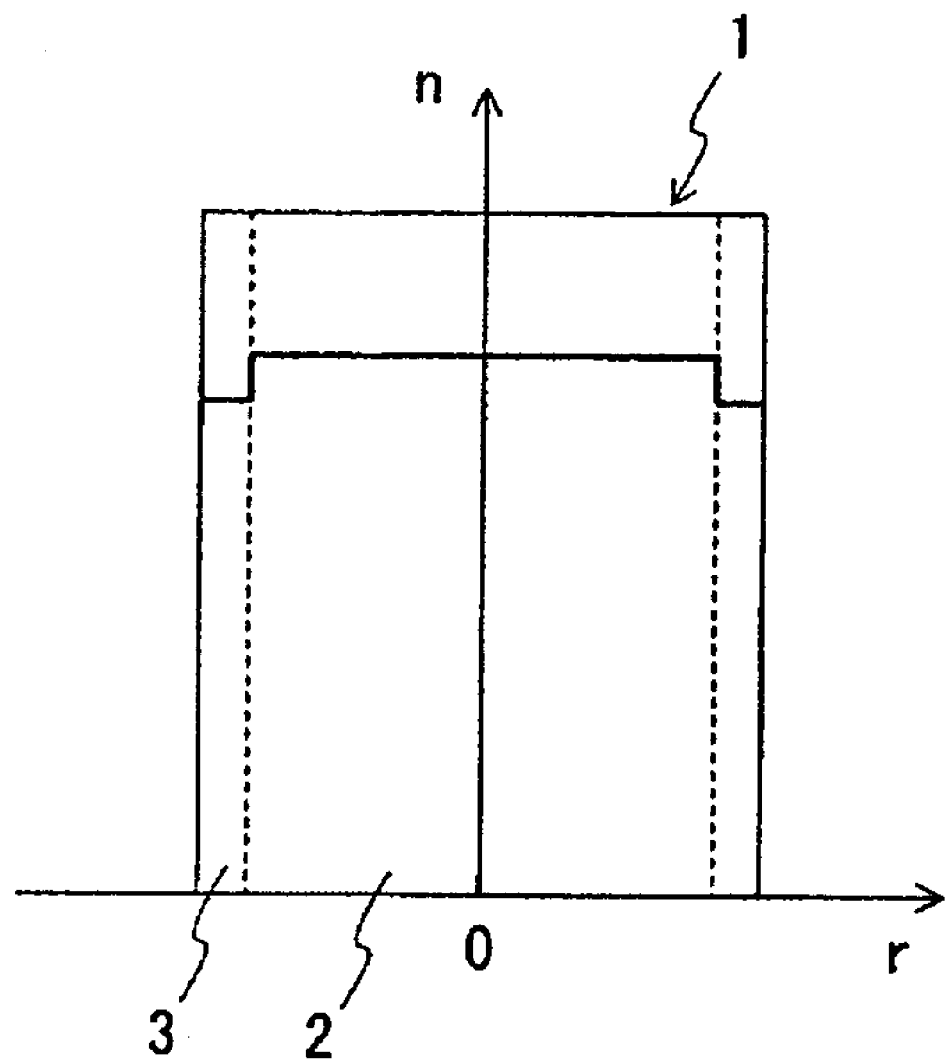
FIG. 3 is a diagram that schematically shows an example of the radial refractive index profile of the mother glass rod.

FIG. 3 schematically shows the refractive index profile in the direction perpendicular to the optical axis (i.e. in the radial direction) of the mother glass rod 1. As shown in FIG. 3, the mother glass rod 1 has been provided with no refractive index distribution, and usually the refractive index of the clad 3 is lower than that of the core 2.

Figure 4:
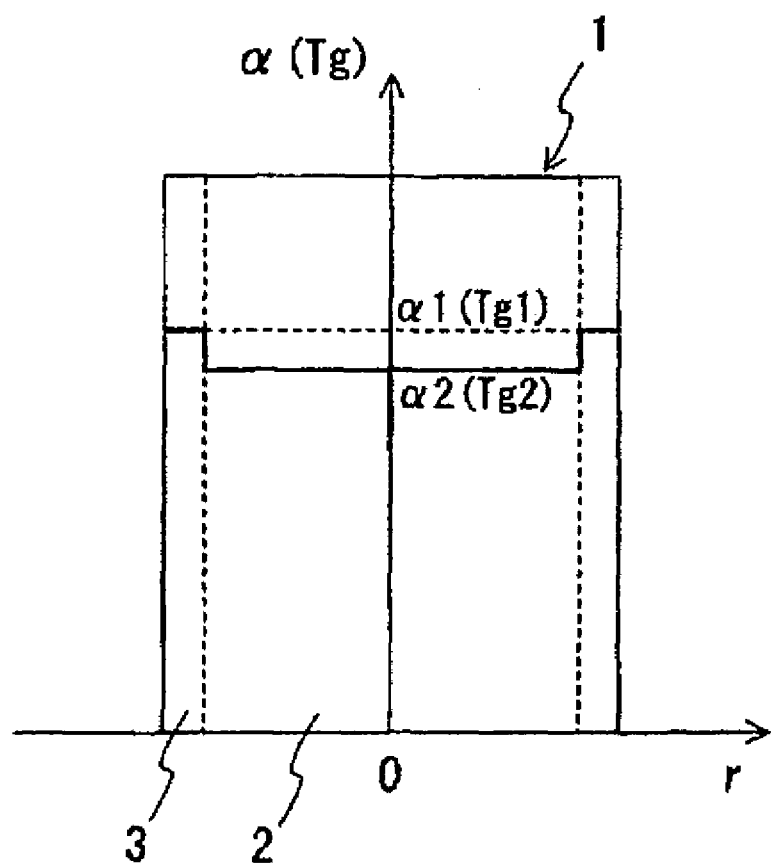
FIG. 4 is a diagram that schematically shows an example of the radial thermal expansion coefficient and glass-transition temperature profile of a mother glass rod from which the rod lens of the present invention can be obtained.

FIG. 4 schematically shows the radial thermal expansion coefficient and glass-transition temperature profile of the mother glass rod 1. As shown in FIG. 4, the thermal expansion coefficient al and the glass-transition temperature Tg1 of the clad 3 are higher than the thermal expansion coefficient $\alpha 2$ and the glass-transition temperature Tg2 of the core 2, respectively.

Rod Lens

The rod lens of the present invention is a rod lens obtained by providing the above-mentioned mother glass rod with a refractive index distribution through ion exchange.

Ion Exchange

Figure 5:
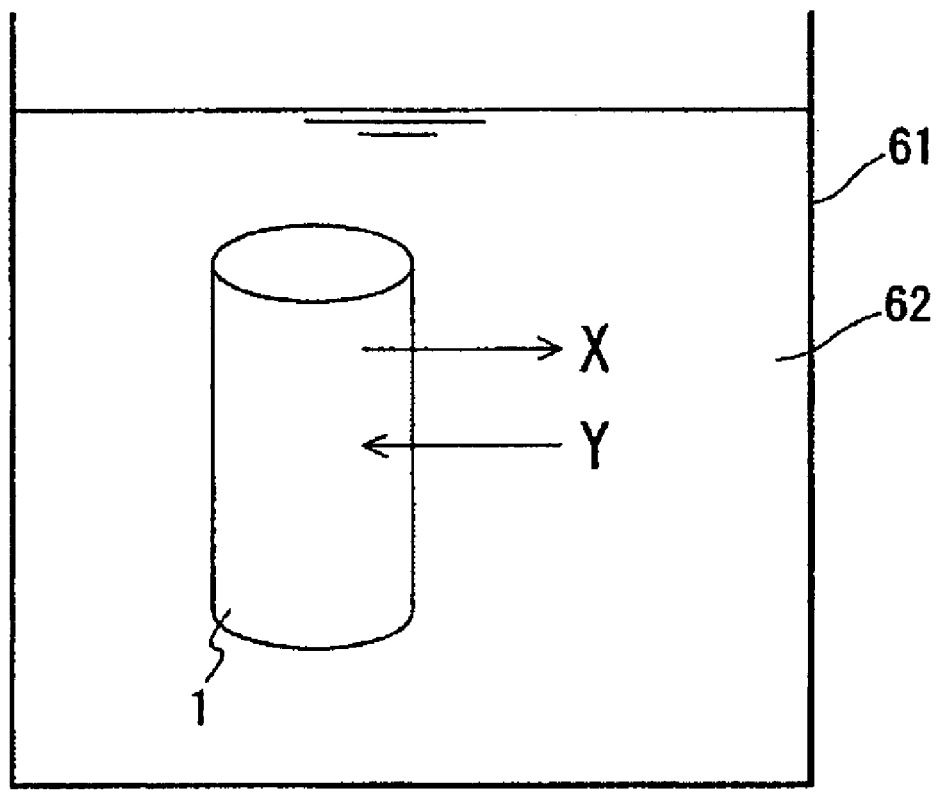
FIG. 5 is a schematic drawing to be used for explaining the principle of ion exchange.

The ion exchange can be carried out according to the common method. For instance, as shown in FIG. 5, the mother glass rod 1 may be immersed in molten salt 62 containing sodium (for example, molten salt of sodium nitrate) that is contained in a container 61 (for instance, made of stainless steel). When the mother glass rod 1 is immersed in the molten salt 62, Li ions (indicated with the letter "X" in FIG. 5) contained in the mother glass rod 1 and Na ions (indicated with the letter "Y" in FIG. 5) contained in the molten salt 62 are exchanged for each other. Thus the mother glass rod 1 is provided with a composition distribution of Li in the radial direction thereof and thereby is provided with a refractive index distribution. Thus a rod lens is formed. The shape of the rod lens thus formed is the same as that of the mother glass rod 1.

Figure 6:
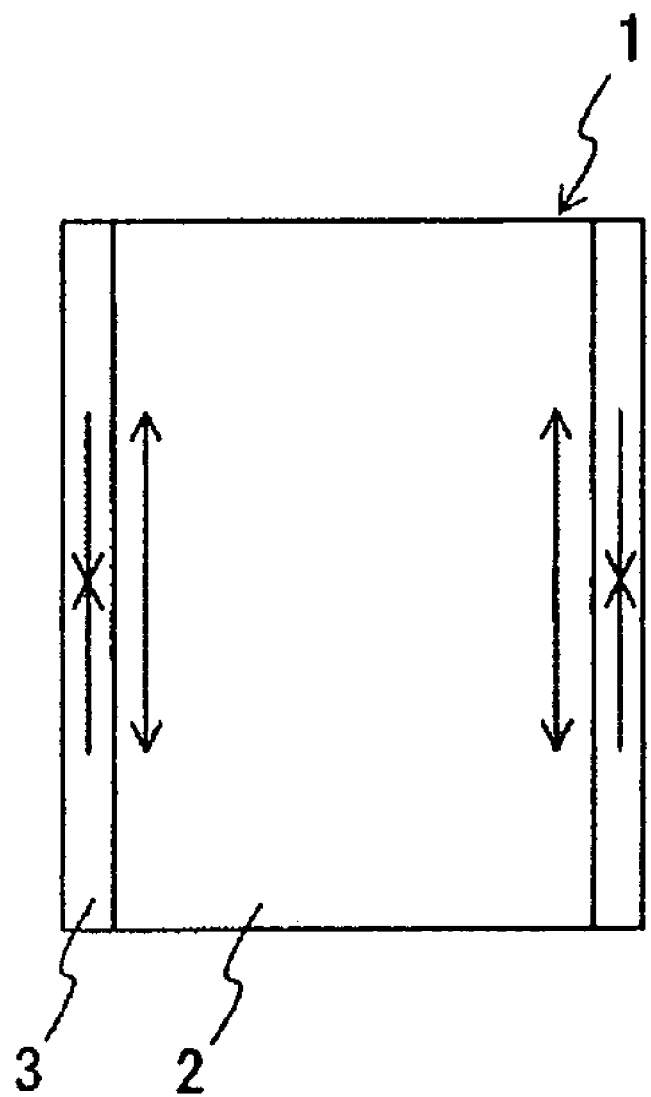
FIG. 6 is a schematic drawing to be used for explaining the stress that is exerted, during ion exchange, on a mother glass rod from which the rod lens of the present invention can be obtained.

When the mother glass rod 1 is immersed in the molten salt 62 and the temperature thereof is raised to the temperature (the ion exchange temperature) of the molten salt 62, the above-mentioned specified relationship between the core 2 and the clad 3 with respect to the thermal expansion coefficient allows the clad 3 to be subjected to compressive stress (see FIG. 6; the arrows shown in FIG. 6 indicate the directions to which the stress is exerted). This prevents the mother glass rod 1 from, for example, warping during the ion exchange. Furthermore, the above-mentioned specified relationship between the core 2 and the clad 3 with respect to the glass-transition temperature allows the compressive stress generated in the clad 3 to be maintained more reliably.

The temperature (the ion exchange temperature) of the molten salt 62 is preferably a temperature around the glass-transition temperature of the core 2 (i.e. the glass-transition temperature of the core glass mother composition) during the ion exchange, and more preferably a temperature that is not higher than the glass-transition temperature of the core 2. In this case, not only warping can be prevented from occurring during the ion exchange but also the rod lens to be formed can be prevented from elongating. In addition, since enough time to carry out the ion exchange can be secured, a suitable refractive index distribution can be provided and thus a rod lens having excellent optical characteristics can be formed.

The rod lens of the present invention is obtained by subjecting the above-mentioned mother glass rod to the ion exchange. Accordingly, the rod lens has a core/clad structure including a core glass and a clad glass covering the core glass. The clad glass and the core glass each contains an alkali metal oxide but are substantially free from lead. The clad glass and the core glass are different from each other in basic composition. That is, the clad glass and the core glass include an alkali metal oxide and have a basic composition including components other than the alkali metal oxide but they are different from each other in the basic composition.

Figure 7:
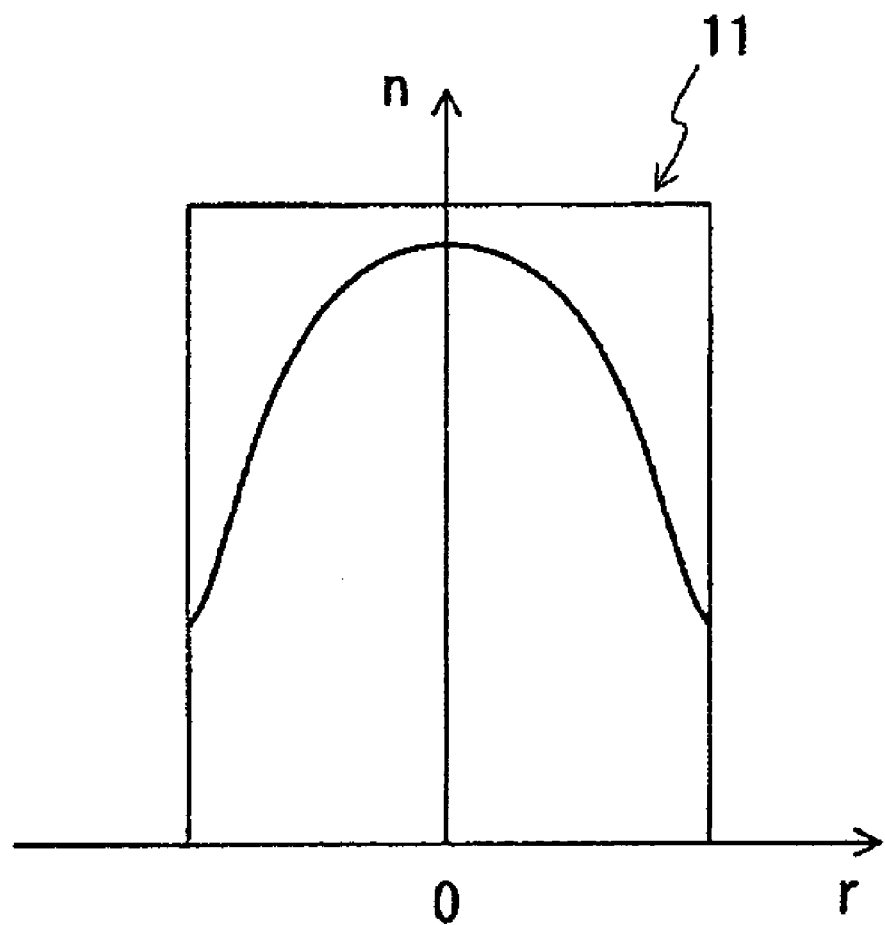
FIG. 7 is a diagram that schematically shows an example of the radial refractive index distribution in the rod lens of the present invention.

FIG. 7 schematically shows the distribution of refractive indices in the radial direction of the rod lens according to the present invention formed through the ion exchange. The rod lens 11 shown in FIG. 7 is provided with the refractive index distribution, when viewed in the radial direction thereof, in which the refractive index decreases relatively with the distance from the center part toward the peripheral part. This refractive index distribution corresponds to the Li distribution in the radial direction of the rod lens 11.

Figure 8:
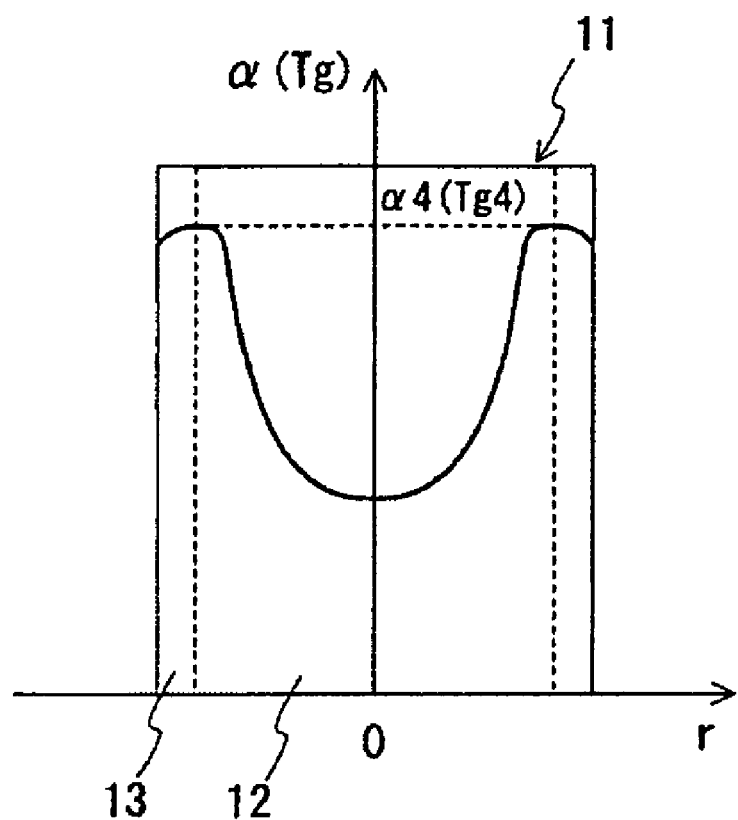
FIG. 8 is a diagram that schematically shows an example of the distribution of the radial thermal expansion coefficient and glass-transition temperature in the rod lens of the present invention.

The rod lens 11 having distributions of thermal expansion coefficients and glass-transition temperatures as shown in FIG. 8 can be formed by subjecting the above-mentioned mother glass rod to the ion exchange. In the rod lens 11 shown in FIG. 8, the thermal expansion coefficient of a clad 13 formed of clad glass is not higher than the thermal expansion coefficient $\alpha 4$ of the vicinity of the interface with the clad 13 of a core 12 formed of a core glass while the glass-transition temperature of the clad 13 is not higher than the glass-transition temperature Tg4 of the vicinity of the interface with the clad 13 of the core 12. Since even after being produced, such a rod lens 11 can maintain the compressive stress generated in the clad 13, the characteristic that is resistant to external stress and the strength of the rod lens can be improved. Furthermore, since warping or the like can be prevented from occurring after the production (for instance, during the formation of a rod lens array), a rod lens with an excellent yield can be obtained. With respect to the thermal expansion coefficient of the core 12, thermal expansion coefficients exceeding the thermal expansion coefficient $\alpha 4$ of the vicinity of the interface with the clad 13 may be obtained partially in the radial direction of the core 12. That is, when the distribution of the thermal expansion coefficients is viewed with respect to the radial direction of the core 12, the thermal expansion coefficient $\alpha 4$ may not be the maximum value. Similarly, with respect to the glass-transition temperature of the core 12, when the distribution of the glass-transition temperatures is viewed with respect to the radial direction of the core 12, the glass-transition temperature Tg4 may not be the maximum value.

Figure 9:
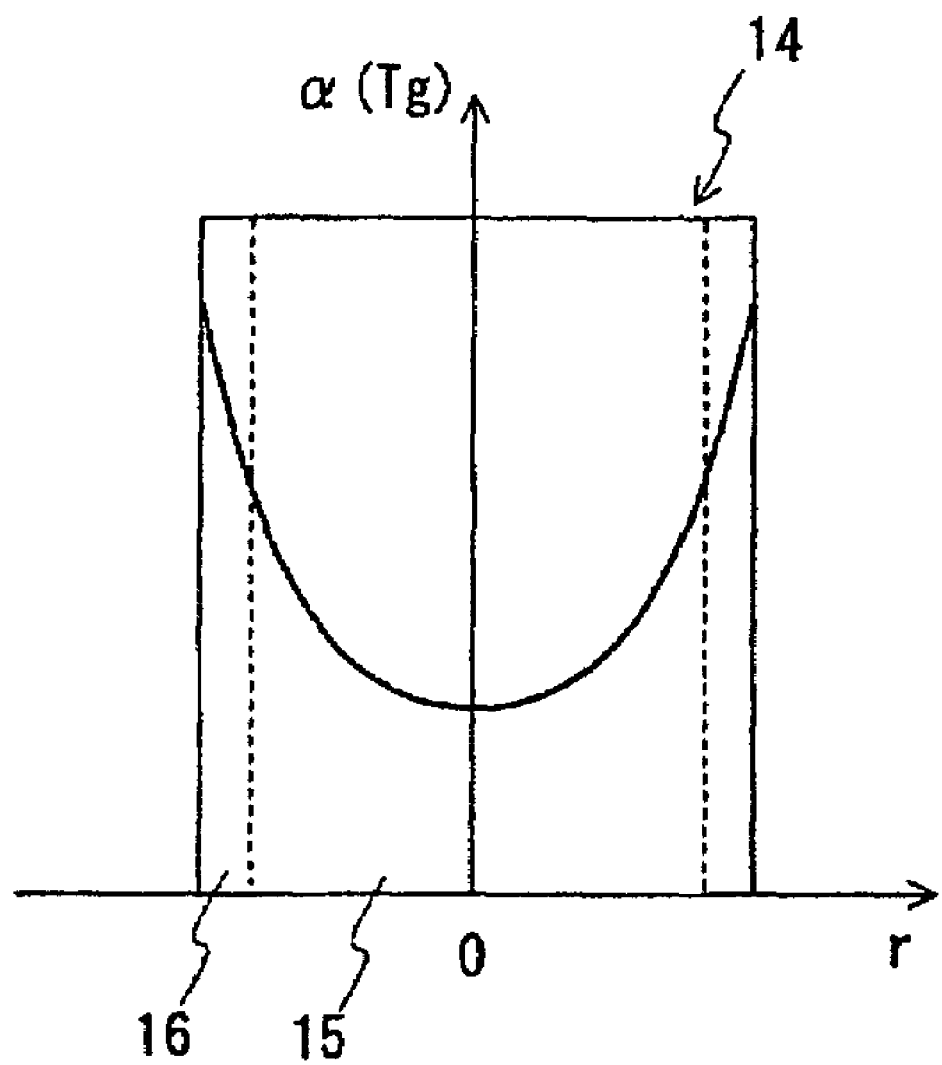
FIG. 9 is a diagram that schematically shows an example of the distribution of the radial thermal expansion coefficient and glass-transition temperature in a conventional rod lens.

In the case of a conventional example in which no consideration is given to the relationships, like those described with respect to the present invention, between the core and the clad of the mother glass rod with respect to the thermal expansion coefficient and the glass-transition temperature, the distributions of the thermal expansion coefficients and/or the glass-transition temperatures in the radial direction of a rod lens formed through ion exchange have a profile shown in FIG. 9. A rod lens 14 (including a core 15 and a clad 16) in which the distributions of the thermal expansion coefficients and the glass-transition temperatures have the profile shown in FIG. 9 has lower stress resistance and may warp with higher frequency after being produced as compared to the rod lens 11 shown in FIG. 8.

Rod Lens Array and Image Processor

Figure 10:
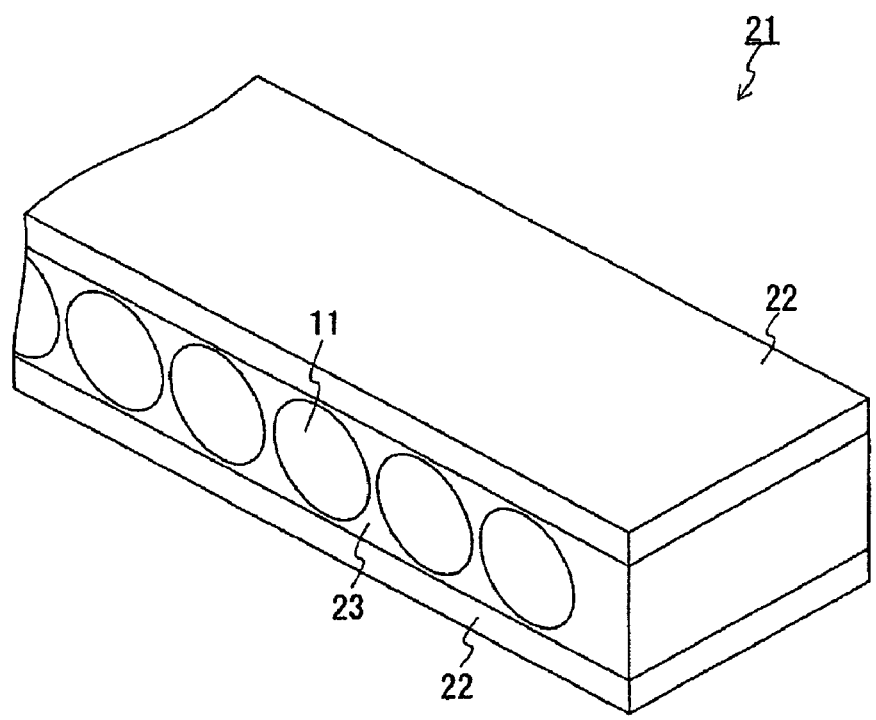
FIG. 10 is a perspective view showing an example of the rod lens array according to the present invention.

FIG. 10 shows an example of the rod lens array according to the present invention. The rod lens array 21 shown in FIG. 10 includes at least two rod lenses 11. The respective rod lenses 11 are arrayed, with their optical axes being substantially in parallel with each other, and are formed into one body together with a pair of FRP substrates 22 and a black resin 23. Such a rod lens array 21 can be formed as follows. That is, after at least two rod lenses 11 are arrayed on the surface of one of the FRP substrates 22 so as to be substantially in parallel with each other and then are sandwiched between the one and the other of the FRP substrates 22, the space between the pair of FRP substrates 22 is filled with the black resin 23, which allows the respective members to be formed into one body, and further the end faces of the rod lenses 11 are polished. Thus the rod lens array 21 can be formed.

The structure and the configuration of the rod lens array according to the present invention are not limited to those of the example shown in FIG. 10. The materials to be used for the respective parts composing the rod lens array can be the same as those that generally are used for a rod lens array.

Figure 11:
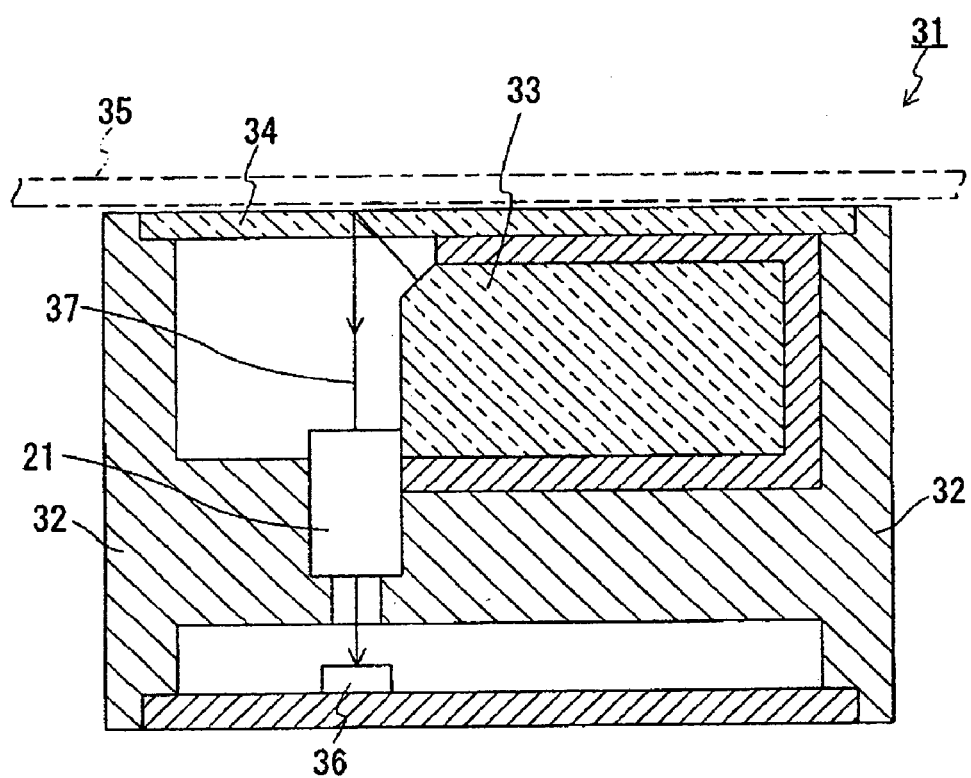
FIG. 11 is a cross-sectional view that schematically shows an example of the image processor according to the present invention.

FIG. 11 shows an example of image reader as an example of the image processor according to the present invention. The image reader 31 shown in FIG. 11 is a scanner and includes a linear lighting unit 33, a document glass 34 formed of a glass sheet, a rod lens array 21, and a photodetector 36, in a housing 32. The rod lens array 21 is disposed on an optical path 37 of light that, when a manuscript 35 is placed on the document glass 34, is emitted from the linear lighting unit 33 to the manuscript 35, is reflected at the surface of the manuscript 35, and then enters the photodetector 36. The rod lens array 21 serves as an imaging optical system that allows the reflected light to form an image in the photodetector 36.

Figure 12:
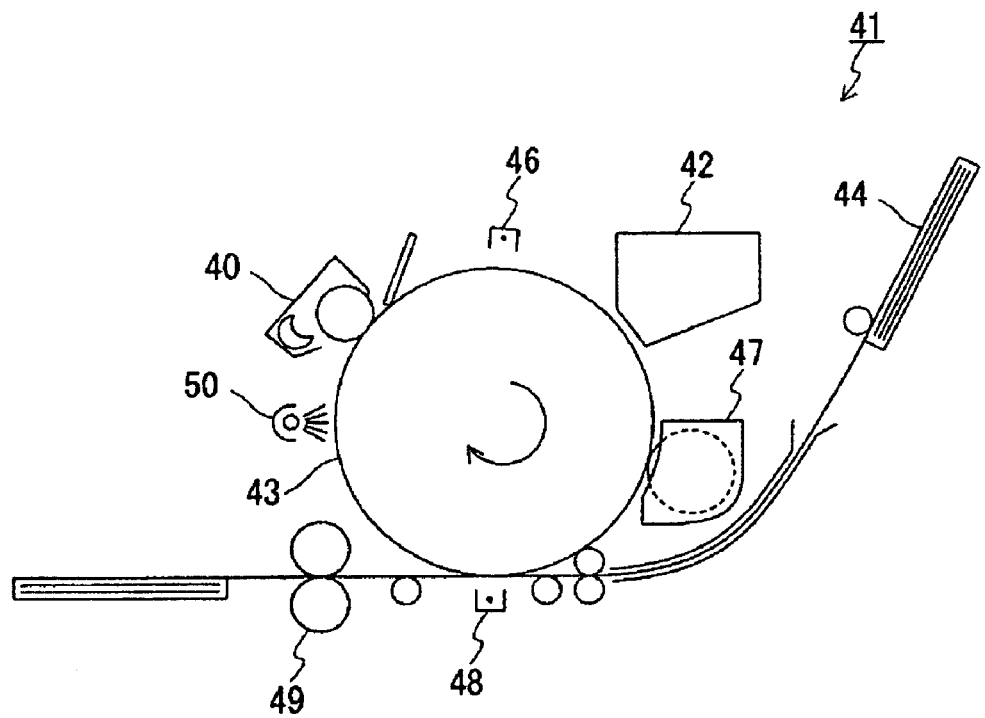
FIG. 12 is a schematic view showing another example of the image processor according to the present invention.
Figure 13:
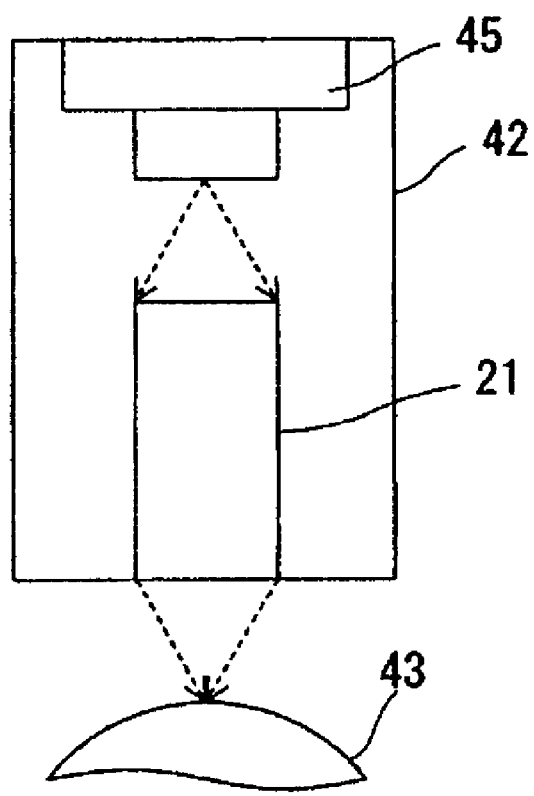
FIG. 13 is a schematic view showing a write head of the image processor shown in FIG. 12.
Figure 14:
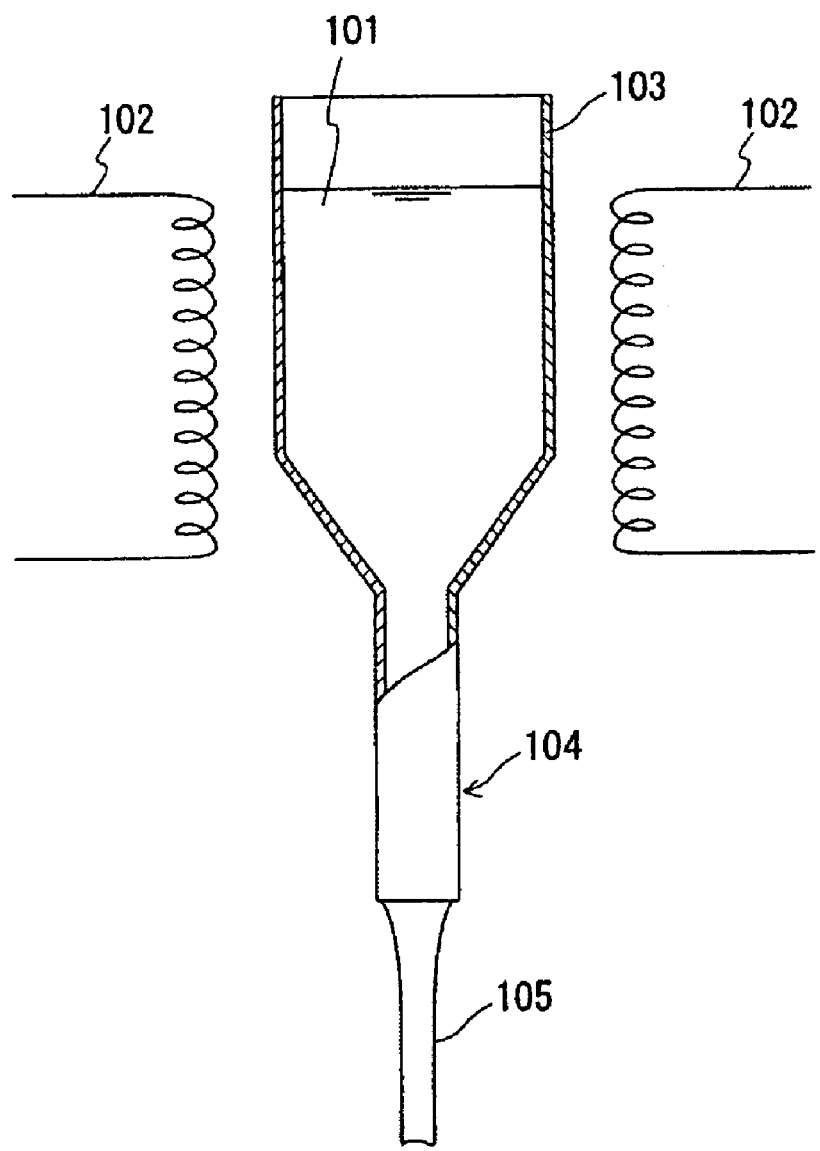
FIG. 14 is a partially cross-sectional view to be used for explaining a common direct drawing method.
Figure 15:
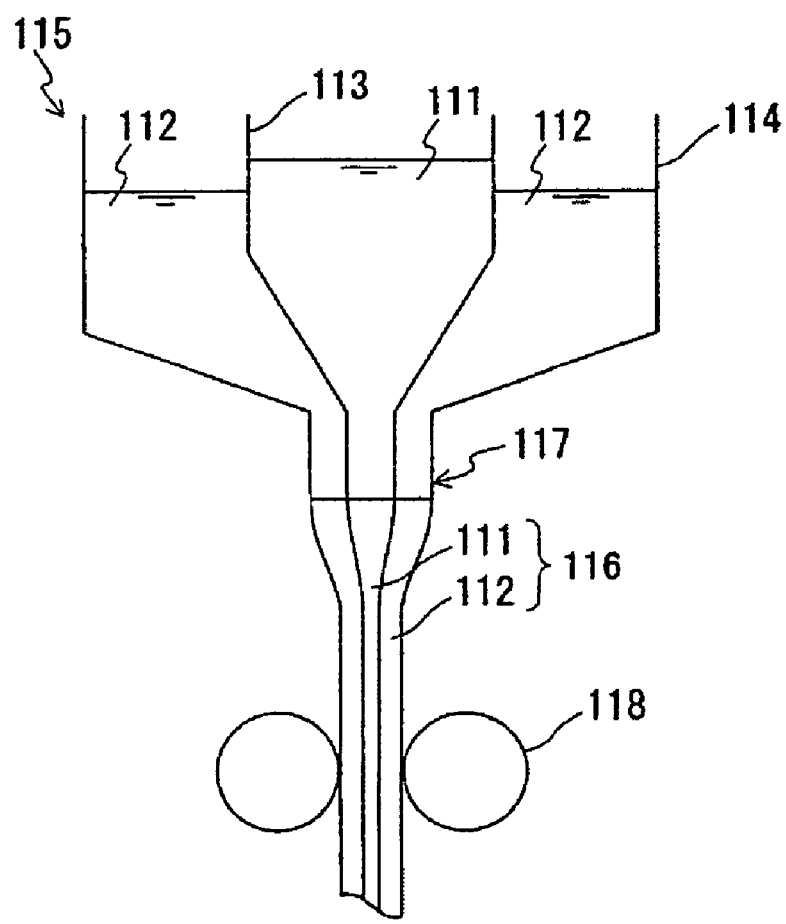
FIG. 15 is a cross-sectional view to be used for explaining a common concentric crucible drawing method.

FIG. 12 shows an example of an image-forming apparatus as another example of the image processor according to the present invention. The image-forming apparatus 41 shown in FIG. 12 is an optical printer. It forms an image (a latent image) by allowing a photoconductor drum 43 to be exposed to light with a write head (an optical write head) 42 and then fixes the image thus formed onto a paper 44. In this case, as shown in FIG. 13, the write head 42 includes a rod lens array 21 of the present invention and a light emitting device array 45. The rod lens array 21 serves as an imaging optical system that allows the photoconductor drum 43 to be exposed to light emitted from the light emitting device array 45 (more specifically, the rod lens array 21 serves as an erecting unit optical system that allows the focal point to fall on the surface of the photoconductor drum 43).

The optical printer shown in FIG. 12 has the same configuration as that of a common optical printer and allows images to be formed on the paper 44 by the same mechanism as that of the common optical printer. Specifically, a photosensitive layer made of a material (a photoreceptor) having photoconductivity such as amorphous Si is formed on the surface of the cylindrical photoconductor drum 43. First, the surface of the photoconductor drum 43 that is rotating is charged uniformly with an electrostatic charger 46. Subsequently, with the write head 42, the photosensitive layer of the photoconductor drum 43 is irradiated with light forming a dot image corresponding to an image to be formed and thereby the charge of the region of the photosensitive layer that has been irradiated with the light is neutralized. Thus a latent image is formed on the photosensitive layer. Thereafter, when allowed to deposit on the photosensitive layer with a developer 47, the toner deposits on the region of the photosensitive layer where the latent image has been formed, in accordance with the charged state of the photosensitive layer. Subsequently, a transfer unit 48 transfers the toner thus deposited onto the paper 44 fed from a cassette. Thereafter, when a fixer 49 heats the paper 44, the toner is fixed to the paper 44 to form an image. After the transfer is completed, the charge of the entire region of the photoconductor drum 43 is neutralized with an erasing lamp 50, and the toner remaining on the photosensitive layer is removed with a cleaner 40.

The rod lens array 21 of the present invention can be applied to arbitrary image processors in addition to the examples shown in FIGS. 11 to 13. Examples of the image processor including the rod lens array 21 include image-forming apparatuses such as LED array printers, liquid crystal shutter printers, etc. as well as image scanners such as facsimiles, scanners, etc.

EXAMPLES

Hereafter, the present invention is described further in detail using examples. The present invention, however, is not limited to the following examples.

In the examples, nine types of mother glass rod samples (Example Samples 1 to 4 and Comparative Example Samples 5 to 9) were produced, with the compositions of the clad glass mother composition and the core glass mother composition being varied to vary the thermal expansion coefficient and the glass-transition temperature of the respective mother compositions. Thereafter, rod lenses were produced by providing the respective samples with a refractive index distribution through ion exchange. Then the yields of the rod lenses obtained through the ion exchange were evaluated.

First, clad glass cullet made of the clad glass mother composition and core glass cullet made of the core glass mother composition were formed by mixing glass materials together, melting the mixture, and then solidifying it so as to have the respective compositions indicated in Tables 1 to 3.

Then, the thermal expansion coefficients and the glass-transition temperatures of the clad glass cullet and core glass cullet formed as described above were measured by the methods described below. Thereafter, the thermal expansion coefficient $\alpha 1$ and the glass-transition temperature Tg1 of the clad glass mother composition as well as the thermal expansion coefficient $\alpha 2$ and the glass-transition temperature Tg2 of the core glass mother composition were determined. The measurement results of $\alpha 1$, $\alpha 2$, Tg1, and Tg2 are indicated in Tables 1 to 3.

Measurement of Thermal Expansion Coefficient and Glass-Transition Temperature

A core glass and a clad glass were processed so as to have a predetermined shape and length and thereby glass blocks were formed. Then the glass-transition temperature and the thermal expansion coefficient of each of them were measured with general-purpose thermal analysis equipment.

Subsequently, after the respective glass cullets were melted, they were put into the concentric crucible shown in FIG. 1 and then were drawn from the nozzle. Thus, mother glass rod samples having a core/clad structure were formed.

Next, the mother glass rods thus formed were provided with a refractive index distribution through the ion exchange shown in FIG. 5. Thus, rod lenses were formed. The ion exchange was carried out by immersing the mother glass rods in molten salt of sodium nitrate to exchange Li ions contained in the mother compositions and Na ions contained in the molten salt for each other. The ion exchange temperature was set at a temperature around the glass-transition temperature Tg2 of the core glass mother composition.

Subsequently, the yields of the rod lenses formed as above were evaluated as follows.

Measurement of Yields of Rod Lens

Arbitrarily, about 300 rod lenses (=A) per lot were taken out of the rod lenses formed through the ion exchange. The amounts of warping of the rod lenses that had been cooled were measured. The number B of the rod lenses having a length of 390 mm in which the amount of warping was 2 mm or smaller was determined. Then the ratio (B/A) of the number B to the above-mentioned number A was taken as the yield. When the amounts of warping of the rod lenses having a length of 390 mm were 2 mm or smaller, it can be said that the decrease in spatial frequency and the distortion of an image that is transmitted occur at levels that cause no practical problems. In this context, the "amount of warping" denotes the length of the line that is drawn perpendicularly to an assumed straight line extending between both ends of the rod lens from the point of the rod lens that is located furthest from the assumed straight line. The results of yield evaluations are indicated in Tables 1 to 3 below.

TABLE 1

| | | Example Sample 1 | | Example Sample 2 | | Example Sample 3 | |
|---|---|---|---|---|---|---|---|
| Components | | Core Glass Mother Composition | Clad Glass Mother Composition | Core Glass Mother Composition | Clad Glass Mother Composition | Core Glass Mother Composition | Clad Glass Mother Composition |
| Composition (mol %) | $SiO_2$ | 52 | 60 | 52 | 54 | 54 | 55 |
| | $Li_2O$ | 12.3 | — | 12.3 | — | 9.5 | — |
| | $Na_2O$ | 11.7 | 27 | 11.7 | 24 | 9 | 27.5 |
| | MgO | 14 | — | 14 | 14 | 14 | — |
| | BaO | 2 | 2 | 2 | 2 | 8 | 2 |
| | $TiO_2$ | 5.5 | 7 | 5.5 | — | 3.5 | 3 |
| | ZnO | — | — | — | 4.5 | — | — |
| | $La_2O_3$ | — | — | — | — | — | — |
| | $Ta_2O_5$ | — | — | — | — | — | 1.2 |
| | $ZrO_2$ | — | — | — | — | — | 2.4 |
| | $B_2O_3$ | 2.5 | 1.4 | 2.5 | 1.5 | 2 | 6 |
| Colorant | $Fe_2O_3$ | — | 2 | — | — | — | 2.3 |
| | CoO | — | 0.6 | — | — | — | 0.6 |
| | Total | 100 | 100 | 100 | 100 | 100 | 100 |
| Specific Gravity (g/cm³) | | 2.72 | 2.755 | 2.72 | 2.72 | 2.954 | 2.944 |
| Thermal Expansion Coefficient α2, α1 (/° C.) | | 128.5 | 134.1 | 128.5 | 135.2 | 115.4 | 120.8 |
| Glass-Transition Temperature Tg2, Tg1 (° C.) | | 478.4 | 509.1 | 478.4 | 483.5 | 493.9 | 520.1 |
| Δα × 10⁻⁷ (/° C.) | | 5.6 | | 6.7 | | 5.3 | |
| ΔTg (° C.) | | 30.7 | | 5.1 | | 26.2 | |
| Yield (%) | | 70 | | 50 | | 80 | |

TABLE 2

| | | Example Sample 4 | | Comparative Example Sample 5 | | Comparative Example Sample 6 | |
|---|---|---|---|---|---|---|---|
| Components | | Core Glass Mother Composition | Clad Glass Mother Composition | Core Glass Mother Composition | Clad Glass Mother Composition | Core Glass Mother Composition | Clad Glass Mother Composition |
| Composition (mol %) | $SiO_2$ | 52 | 52 | 52 | 56.5 | 52 | 60.9 |
| | $Li_2O$ | 12.3 | — | 12.3 | — | 12.3 | — |
| | $Na_2O$ | 11.7 | 22.7 | 11.7 | 23.4 | 11.7 | 18.3 |
| | MgO | 14 | 14 | 14 | 7.8 | 14 | 5.9 |
| | BaO | 2 | 2 | 2 | 3.2 | 2 | 5.9 |
| | $TiO_2$ | 5.5 | — | 5.5 | — | 5.5 | — |
| | ZnO | 1.25 | 7 | — | — | 1.25 | 5 |
| | $La_2O_3$ | — | — | — | — | — | 2 |
| | $Ta_2O_5$ | — | — | — | — | — | — |
| | $ZrO_2$ | 1.25 | — | — | — | 1.25 | — |
| | $B_2O_3$ | — | 2.3 | 2.5 | 6.6 | — | 2 |
| Colorant | $Fe_2O_3$ | — | — | — | 1.9 | — | — |
| | CoO | — | — | — | 0.6 | — | — |
| | Total | 100 | 100 | 100 | 100 | 100 | 100 |
| Specific Gravity (g/cm³) | | 2.789 | 2.778 | 2.72 | 2.734 | 2.789 | 3.029 |
| Thermal Expansion Coefficient α2, α1 (/° C.) | | 131.7 | 134 | 125.2 | 126.8 | 131.7 | 116.2 |
| Glass-Transition Temperature Tg2, Tg1 (° C.) | | 489.5 | 492.3 | 478.4 | 501.5 | 489.5 | 522 |
| Δα × 10⁻⁷ (/° C.) | | 2.4 | | 1.6 | | −15.4 | |
| ΔTg (° C.) | | 2.8 | | 23.1 | | 32.5 | |
| Yield (%) | | 40 | | 20 | | 15 | |

TABLE 3

| | | Sample No. | | | | | |
|---|---|---|---|---|---|---|---|
| | | Comparative Example Sample 7 | | Comparative Example Sample 8 | | Comparative Example Sample 9 | |
| | Components | Core Glass Mother Composition | Clad Glass Mother Composition | Core Glass Mother Composition | Clad Glass Mother Composition | Core Glass Mother Composition | Clad Glass Mother Composition |
| Composition (mol %) | $SiO_2$ | 52 | 50.8 | 52 | 54.5 | 52 | 60 |
| | $Li_2O$ | 12.3 | — | 12.3 | — | 12.3 | — |
| | $Na_2O$ | 11.7 | 22.9 | 11.7 | 21.5 | 11.7 | 24 |
| | MgO | 14 | 13.6 | 14 | 13.7 | 14 | — |
| | BaO | 2 | 3.9 | 2 | 2.9 | 2 | — |
| | $TiO_2$ | 5.5 | — | 5.5 | — | 5.5 | 8.6 |
| | ZnO | 1.25 | — | — | — | — | — |
| | $La_2O_3$ | — | — | — | — | — | — |
| | $Ta_2O_5$ | — | — | — | — | — | — |
| | $ZrO_2$ | 1.25 | — | — | — | — | — |
| | $B_2O_3$ | — | 6.3 | 2.5 | 4.9 | 2.5 | 4.5 |
| Colorant | $Fe_2O_3$ | — | 1.9 | — | 1.9 | — | 2.3 |
| | CoO | — | 0.6 | — | 0.6 | — | 0.6 |
| | Total | 100 | 100 | 100 | 100 | 100 | 100 |
| Specific Gravity (g/cm$^3$) | | 2.789 | 2.779 | 2.72 | 2.731 | 2.72 | 2.692 |
| Thermal Expansion Coefficient α2, α1 (/° C.) | | 131.7 | 128 | 125.2 | 122.7 | 125.2 | 114.5 |
| Glass-Transition Temperature Tg2, Tg1 (° C.) | | 489.5 | 484 | 478.4 | 501.7 | 478.4 | 539.9 |
| Δα × 10$^{-7}$ (/° C.) | | -3.6 | | -2.5 | | -10.7 | |
| ΔTg (° C.) | | -5.5 | | 23.3 | | 61.5 | |
| Yield (%) | | 20 | | 20 | | 10 | |

As shown in Tables 1 to 3, as compared to Comparative Example Samples 5 to 9, Example Samples 1 to 4 allowed improved yields to be obtained through the ion exchange. Particularly in Example Samples 1 to 3, yields of at least 50% were obtained and a high yield, specifically 80% was obtained in Example Sample 3.

Generally, once the glass composition is determined, the glass-transition temperature and the thermal expansion coefficient are determined. The radial element distribution in the rod lens formed of each example sample was specified using an energy dispersive X-ray detector with which a general-purpose electron probe microanalyzer is equipped. From the results of the element distribution thus obtained, the distributions of the thermal expansion coefficient and the glass-transition temperature of the rod lens concerned were evaluated. As a result, the distributions such as the one shown in FIG. 8 were observed in the case of Example Samples 1 to 4.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A gradient-index rod lens having a core/clad structure that is obtained by providing a mother glass rod with a refractive index distribution through ion exchange, the mother glass rod comprising a mother composition of a core glass and a mother composition of a clad glass that covers the mother composition of the core glass, wherein the clad glass and the core glass each contain an alkali metal oxide but are substantially free from lead, the clad glass and the core glass each contain an alkali metal oxide and have a basic composition including components other than the alkali metal oxide, and the clad glass and the core glass are different from each other in the basic composition, the mother composition of the clad glass has a higher thermal expansion coefficient and a higher glass-transition temperature than those of the mother composition of the core glass, and a difference Δα between a thermal expansion coefficient α1 of the mother composition of the clad glass and a thermal expansion coefficient α2 of the mother composition of the core glass, specifically Δα=α1−α2, is larger than 2×10$^{-7}$/° C. but smaller than 20×10$^{-7}$/° C.

2. The gradient-index rod lens according to claim 1, wherein a difference ΔTg between a glass-transition temperature Tg1 of the mother composition of the clad glass and a glass-transition temperature Tg2 of the mother composition of the core glass, specifically ΔTg=Tg1−Tg2, is larger than 3° C. but smaller than 60° C.

3. The gradient-index rod lens according to claim 1, wherein the mother composition of the clad glass and the mother composition of the core glass each contains an alkali metal oxide and has a basic composition including components other than the alkali metal oxide, and the mother compositions of the clad glass and the core glass are different from each other in the basic composition.

4. The gradient-index rod lens according to claim 3, wherein the mother composition of the clad glass and the mother composition of the core glass are not completely identical to each other in type of oxides other than the alkali metal oxide.

5. The gradient-index rod lens according to claim 3, wherein the mother composition of the clad glass and the mother composition of the core glass are identical to each other in type of oxides other than the alkali metal oxide, and the mother compositions of the clad glass and the core glass are different from each other in content by percentage of at least one selected from the oxides.

6. The gradient-index rod lens according to claim 3, wherein the mother composition of the clad glass and the mother composition of the core glass each contains $SiO_2$, $TiO_2$, and an alkaline earth metal oxide, and the mother compositions of the clad glass and the core glass are different from each other in ratio $X_2/X_1$ of the content by percentage $X_2$ of $TiO_2$ to the total $X_1$ of the content by percentage of the alkaline-earth metal oxide.

7. The gradient-index rod lens according to claim 1, wherein the mother composition of the clad glass contains $SiO_2$ and $Na_2O$, and the mother composition of the core glass contains $SiO_2$, $Na_2O$, and $Li_2O$.

8. The gradient-index rod lens according to claim 7, wherein the mother composition of the clad glass and the mother composition of the core glass each further comprises an alkaline-earth metal oxide, and the total $X_1$ of the content by percentage of the alkaline-earth metal oxide is less than 25 mol % in each of the mother composition of the clad glass and the mother composition of the core glass.

9. The gradient-index rod lens according to claim 1, wherein the mother composition of the core glass comprises the following components, indicated by mol %:

| | |
|---|---|
| $SiO_2$ | 45 to 65%; |
| $Li_2O$ | 3 to 20%; |
| $Na_2O$ | 3 to 15%; |
| $K_2O$ | 0 to 10%; |
| $MgO$ | 0 to 15%; |
| $SrO$ | 0 to 20%; |
| $BaO$ | 0 to 20%; |
| $B_2O_3$ | 0 to 15%; |
| $ZnO$ | 0 to 10%; |
| $TiO_2$ | 0 to 10%; |
| $Y_2O_3$ | 0 to 7%; |
| $ZrO_2$ | 0 to 7%; |
| $Nb_2O_5$ | 0 to 7%; |
| $In_2O_3$ | 0 to 7%; |
| $La_2O_3$ | 0 to 7%; and |
| $Ta_2O_5$ | 0 to 10%, | where the total of $ZnO+TiO_2+Y_2O_3+ZrO_2+Nb_2O_5+In_2O_3+La_2O_3+Ta_2O_5$ is in a range of 0 to 20 mol %, the total of $Li_2O+Na_2O+K_2O$ is in a range of 6 to 35 mol %, and the total of $BaO+SrO+MgO$ is in a range of 0 to 25 mol %, and the mother composition of the clad glass comprises the following components, indicated by mol %:

| | |
|---|---|
| $SiO_2$ | 45 to 65%; |
| $Li_2O$ | 0 to 15%; |
| $Na_2O$ | 3 to 30%; |
| $K_2O$ | 0 to 10%; |
| $MgO$ | 0 to 15% |
| $SrO$ | 0 to 20%; |
| $BaO$ | 0 to 20%; |
| $B_2O$ | 30 to 15%; |
| $Bi_2O_3$ | 0 to 10%; |
| $ZnO$ | 0 to 10%; |
| $TiO_2$ | 0 to 10%; |
| $Y_2O_3$ | 0 to 7%; |
| $ZrO_2$ | 0 to 7%; |
| $Nb_2O_5$ | 0 to 7%; |
| $In_2O_3$ | 0 to 7%; |
| $La_2O_3$ | 0 to 7%; and |
| $Ta_2O_5$ | 0 to 10%, | where the total of $Bi_2O_3+ZnO+TiO_2+Y_2O_3+ZrO_2+Nb_2O_5+In_2O_3+La_2O_3+Ta_2O_5$ is in a range of 0 to 20 mol %, the total of $Li_2O+Na_2O+K_2O$ is in a range of 3 to 35 mol %, and the total of $BaO+SrO+MgO$ is in a range of 0 to 25 mol %.

10. The gradient-index rod lens according to claim 1, wherein the mother composition of the clad glass contains an oxide of at least one element selected from the group consisting of Fe, Co, Ni, Mn, Cr, and Cu, as a colorant, and the content by percentage of the colorant contained in the mother composition of the clad glass is in a range of 0.1 to 10 mol %.

11. The gradient-index rod lens according to claim 1, wherein the refractive index distribution is provided through the ion exchange at a temperature around a glass-transition temperature Tg2 of the mother composition of the core glass.

12. The gradient-index rod lens according to claim 1, wherein the refractive index distribution is provided through the ion exchange at a temperature that is not higher than a glass-transition temperature Tg2 of the mother composition of the core glass.

13. A rod lens array comprising at least two gradient-index rod lenses according to claim 1, wherein the rod lenses are arrayed and formed into one body, with their optical axes being substantially in parallel with each other.

14. An image processor comprising a rod lens array according to claim 13, wherein the rod lens array serves as an imaging optical system.

* * * * *